United States Patent
Hecker, Jr. et al.

[15] 3,699,601
[45] Oct. 24, 1972

[54] DOCKBOARD ASSEMBLY

[72] Inventors: Robert W. Hecker, Jr., Clare, Mich.; Robert C. Beckwith, Scotts Bluff, Nebr.

[73] Assignee: Loomis Machine Company, Clare, Mich.

[22] Filed: Feb. 10, 1971

[21] Appl. No.: 114,264

[52] U.S. Cl.....................................14/71
[51] Int. Cl................................B65g 11/00
[58] Field of Search..........................14/71

[56] References Cited

UNITED STATES PATENTS

| | | | |
|---|---|---|---|
| 3,409,922 | 11/1968 | Beckwith et al. | 14/71 |
| 3,117,332 | 1/1964 | Kelley | 14/71 |
| 3,579,696 | 5/1971 | Hecker et al. | 14/71 |

*Primary Examiner*—Jacob L. Nackenoff
*Attorney*—McGlynn, Reising, Milton & Ethington

[57] ABSTRACT

A dockboard assembly including a support means, a ramp means pivotally connected at a first end to the support means and extending to a second end, and lip means pivotally connected to the second end of the ramp means for pivotal movement between an extended cantilevered position and a pendant position. A cam is rotatably connected to the ramp means and a lift arm is pivotally connected to the support means and has a roller at the other end engaging the cam for pivoting the ramp means upwardly from any position in which the ramp means is disposed. A releasable hold-down means interconnects the support means and the ramp means for normally preventing the ramp means from moving upwardly. The hold-down means is also operable to allow the ramp means to be pivoted upwardly by the lift means and automatically allows the ramp means to pivot downwardly. A latch link is pivotally connected to the linkage with moves the lip means to an extended cantilevered position in response to rotation of the cam. The latch link is moved upwardly into positive latching engagement with an abutment pin on the ramp in response to rotation of the cam. Control pawls are pivotally connected to the lip linkage for automatically engaging the hold-down means to release the hold-down means as the lip means pivots from an extended position toward the pendent position when the ramp is below the dock and allows the hold-down means to keep the ramp locked when the lip is in the pendant position and the ramp is in any position below dock level.

13 Claims, 6 Drawing Figures

PATENTED OCT 24 1972

INVENTORS
Robert W. Hecker, Jr. &
BY Robert C. Beckwith

Barnard, McGlynn & Reising
ATTORNEYS

DOCKBOARD ASSEMBLY

The instant invention relates to a dockboard assembly of the type utilized in conjunction with a loading dock to faciliate the free movement of traffic between the loading dock and an adjacent vehicle, such as the bed of a truck, railroad car, or the like. Such dockboard assemblies are frequently disposed in a recess in the front of a concrete dock, or the like, and include a support structure to which a ramp is pivotally connected. The ramp is pivotal between a below dock level position and a raised position above dock level. An extension lip is hinged to the front end of the ramp and hangs in a pendent position when the dockboard assembly is not in use and the ramp is in its so-called cross-traffic or dock level position, in which position the ramp is flush with the upper surface of the dock. The lip is moved to an extended cantilevered position forming an extension of the ramp when the dockboard assembly is in use so that the lip may rest upon the bed of a truck or the like which is being loaded or unloaded.

The instant invention is specifically directed to a dockboard assembly of the type which is known as being "nose-light." Such a dockboard assembly is one wherein a lift means, which normally includes a plurality of springs, urges or pivots the ramp upwardly with sufficient force that the weight of the ramp does not overcome the lift means. In such an assembly, the ramp is fixed in the desired position by a releasable hold-down means which acts in opposition to the lift means for restraining or preventing the ramp from being raised by the lift means. Normally, the hold-down means may be manually released to allow the ramp to pivot upwardly under the influence of the lift means. Such hold-down means are automatically operable to allow the ramp to pivot downwardly when a sufficient force is applied thereto, such as by an operator walking onto the ramp.

These dockboard assemblies are normally stored with the ramp substantially horizontal and in the dock level position and supported against downward movement by the lip which is pendent and has its distal or downward end engaging supports. Alternatively, the ramp is supported in the dock level position by safety legs disposed between the support means or structure and the ramp. The ramp is thereby supported when in the dock level position so that traffic may move along the dock and over the horizontal ramp without the ramp pivoting downward to a position below dock level.

To operate such a dockboard assembly when it is in the stored position, the hold-down means is usually manually released so that the ramp pivots upwardly. During this upward pivotal movement of the ramp, the lip is moved from the pendent position toward the raised extended position where it is latched so as to remain in the extended position. Typically in the past, the lip has been moved to the extended position by a cable interconnecting the support means or structure and a lever, or the like so, that as the ramp moves upwardly and the cable becomes taut, the lip is moved to the extended position. A separate latching mechanism is provided to latch the lip in an extended position to which it has been moved. Examples of such dockboard assemblies are set forth in U.S. Pats. Nos. 3,117,332; 3,199,133; 3,203,002 and 3,249,956. The problem with such assemblies is that the lip does not consistently latch when the ramp pivots upwardly. The reason is that the movement of the lip to an extended position depends upon the inertia or momentum of the ramp as it moves upwardly to place the cable connected to the lip in tension and such inertia or momentum is not always the same or consistent and may change during use of a dockboard. In other words, the means or mechanism which urges the ramp to pivot upwardly may vary in the force applied to the ramp so that in some instances the ramp must not move upwardly with sufficient momentum to cause the lip to be raised sufficiently to be latched in an extended position.

Once the ramp is raised and the lip is latched in the extended position, the ramp is lowered, as by an operator walking onto the ramp, until the lip rests upon an adjacent vehicle, such as the bed of a truck. Once in this position, the distal end of the lip is supported in the extended position solely by resting upon the adjacent vehicle and the ramp is prevented from pivoting upwardly by the hold-down means. After an adjacent vehicle has been fully loaded or unloaded, it moves away from the dock and the lip falls or pivots downwardly relative to the ramp from the extended position to the pendent position. Because the hold-down means prevents the ramp from pivoting upwardly, the ramp remains fixed in this position unless it is urged downwardly. If the ramp is in an above dock level position when the vehicle moves away from the dock, an operator may walk onto the ramp to pivot it downwardly to the dock level position. The problem associated with such assemblies is, however, that very frequently the ramp is slightly below dock level when the truck moves away and remains there as the operator neglects to manually release the hold-down means and return the ramp to the cross-traffic position where it will be supported by the lip or movable means which extend between the ramp and support means or structure. When the ramp is below dock level and not supported, it is free to pivot downwardly and therefore serious accidents may occur as fork lift trucks may be driven across ramps on the assumption that they are supported in the dock level position. A solution to this problem is provided by the assembly disclosed and claimed in copending United States Application, Ser. No. 787,652, filed Dec. 30, 1968, now U.S. Pat. No. 3,579,696 assigned to the Assignee of the instant invention. In accordance with the invention set forth in U.S. Pat. No. 3,579,696, means are provided to automatically release the hold-down means in response to pivotal movement of the lip from the extended position to the pendent position so that the ramp will automatically raise to a position above dock level after a vehicle moves away from the dock.

There are dockboards known in the prior art which automatically return to dock level as a vehicle moves away from the dock but these dockboards are not of the "nose light" type. An example of such a dockboard is shown in U.S. Pat. No. 3,327,335. Additionally, there are dockboards known which are of the "nose light" type and in which the lip is moved to and latched in an extended position by linkage means which is responsive to the lift means but these boards do not provide means for automatically releasing the hold-down means. An example of such an assembly is shown in U.S. Pat. No. 3,454,974.

Accordingly, it is an object and feature of this invention to provide an improved "nose light" dockboard assembly having improved functional characteristics and comprising a novel combination of components including lift means for pivoting the ramp upwardly and hold-down means for normally preventing upward pivotal movement of a ramp with a cam rotatably connected to the ramp means for reacting between the lift means and the ramp.

In correlation with the foregoing object and feature, it is another object and feature of this invention to provide such an improved dockboard assembly which includes latching means for supporting a lip means in an extended latched position and engageable by the cam so as to be positively moved by the cam to the latched position as the ramp is pivoted upwardly and which is automatically movable from the latched position as the lip means engages and is supported by an adjacent vehicle.

In correlation with the foregoing objects and features, it is another object and feature of this invention to provide such an improved dockboard assembly which includes lip linkage means pivotally connected to the lip means at one end and engageable by the cam at the other end for moving the lip means to the extended cantilevered position and including control means operatively connected to the lip linkage means for engaging the hold-down means to release the latter as the lip means pivots from an extended position toward the pendent position.

Other objects and attendant advantages of the present invention will be readily appreciated as the same becomes better understood by reference to the following detailed description when considered in connection with the accompanying drawings wherein.

Referring now the drawings wherein like numerals indicate like parts throughout the several views, a dockboard assembly constructed in accordance with the instant invention is generally shown at 10.

Figure 1:
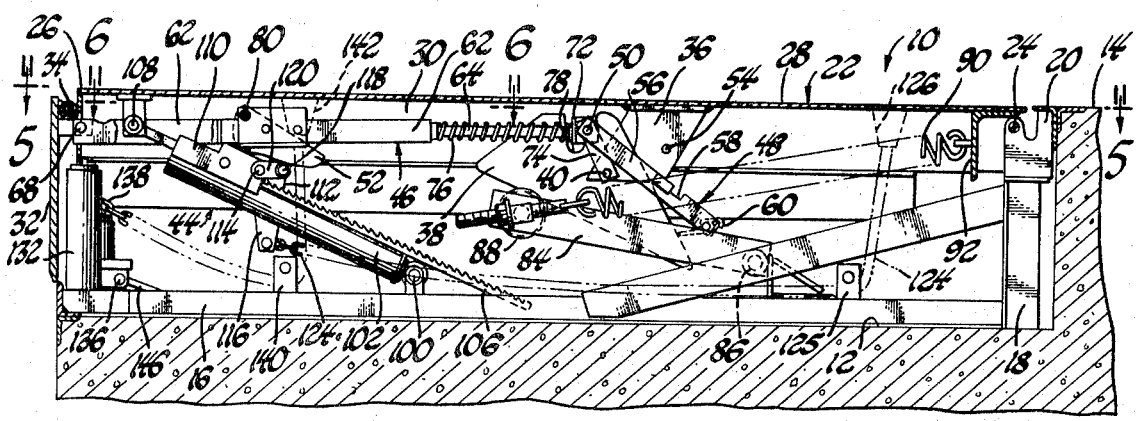
FIG. 1 is a side view of a preferred embodiment of the present invention partially in cross section and showing the ramp in the dock level position.

The dockboard assembly 10 is illustrated as being disposed in a recess 12 in a concrete dock or platform which has an upper surface 14.

The assembly 10 includes a support means or structure comprising the structural members 16, 18 and 20 secured in the recess 12 of the dock.

The dockboard assembly 10 also includes a ramp or ramp means 22 pivotally connected at a first end as indicated at 24 to the structural members 20 of the support means and extends to a second end 26. The ramp is pivotally supported for pivotal movement between raised and lowered positions such as those exemplified in FIGS. 2 and 4. The ramp means 22 includes an upper plate 28 and a plurality of channel beams 30.

Figure 2:
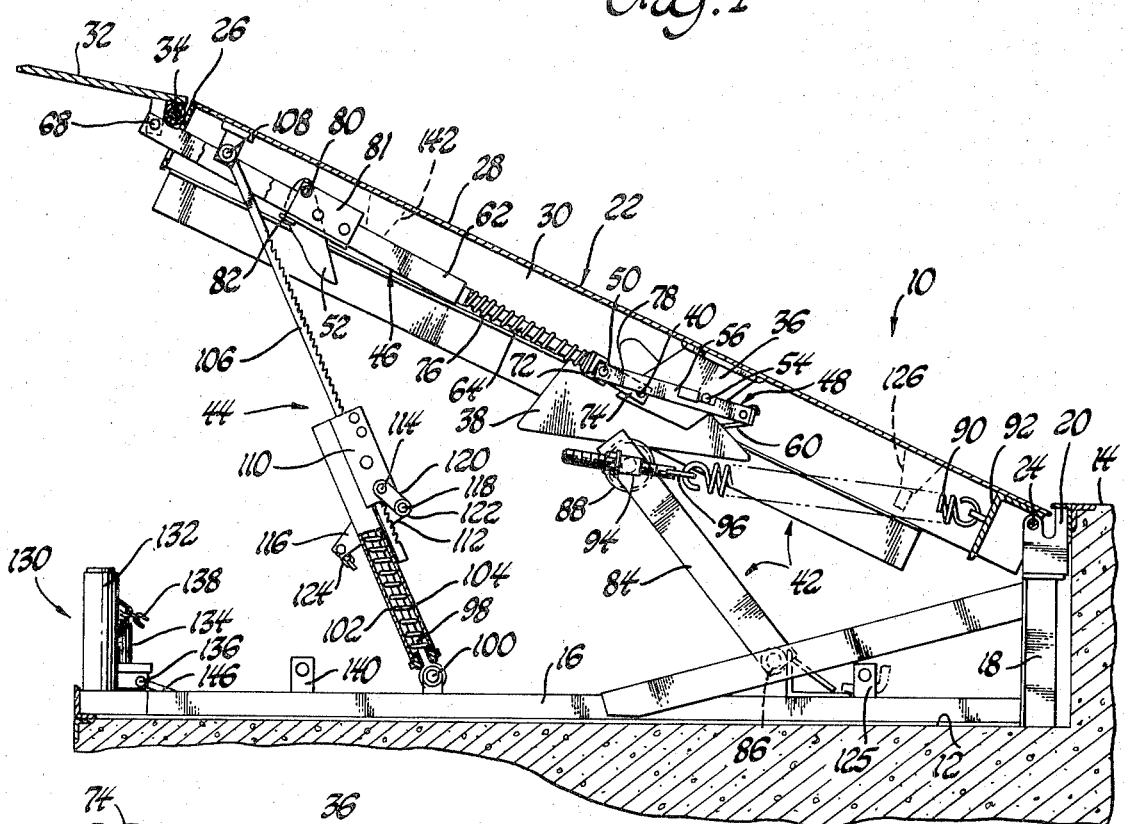
FIG. 2 is a side elevational view partially in cross section but showing the ramp in a raised position above dock level.
Figure 3:
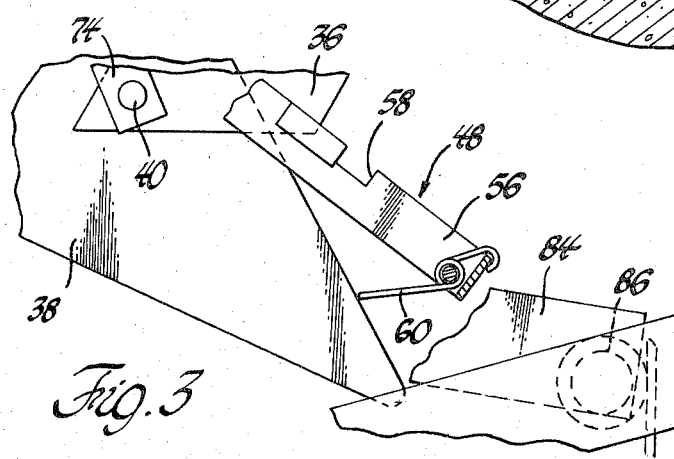
FIG. 3 is an enlarged fragmentary view of the cam which is rotatably connected to the ramp and a portion of the latch link which supports the lip means in an extended position.
Figure 4:
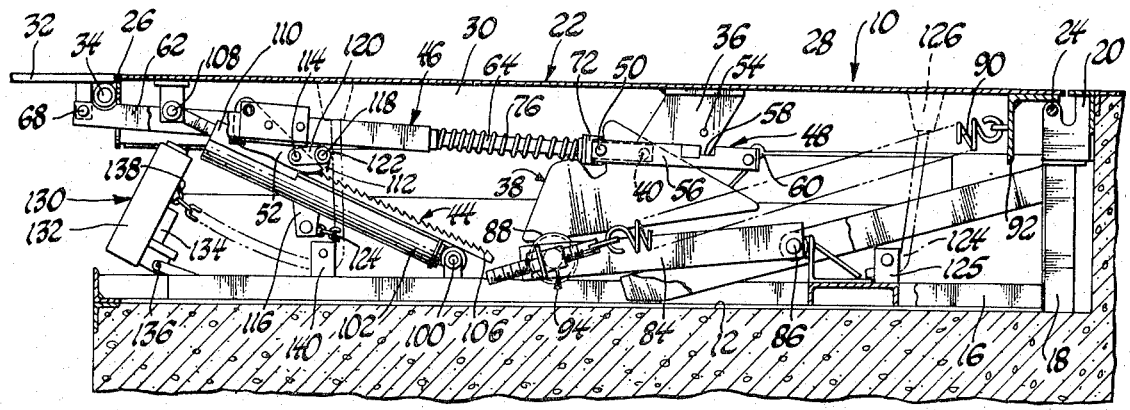
FIG. 4 is an elevational view partially in cross section similar to FIG. 1 but showing the lip in the extended position and supported on an adjacent vehicle or just about to fall from the extended position in which it has been supported by an adjacent vehicle.
Figure 5:
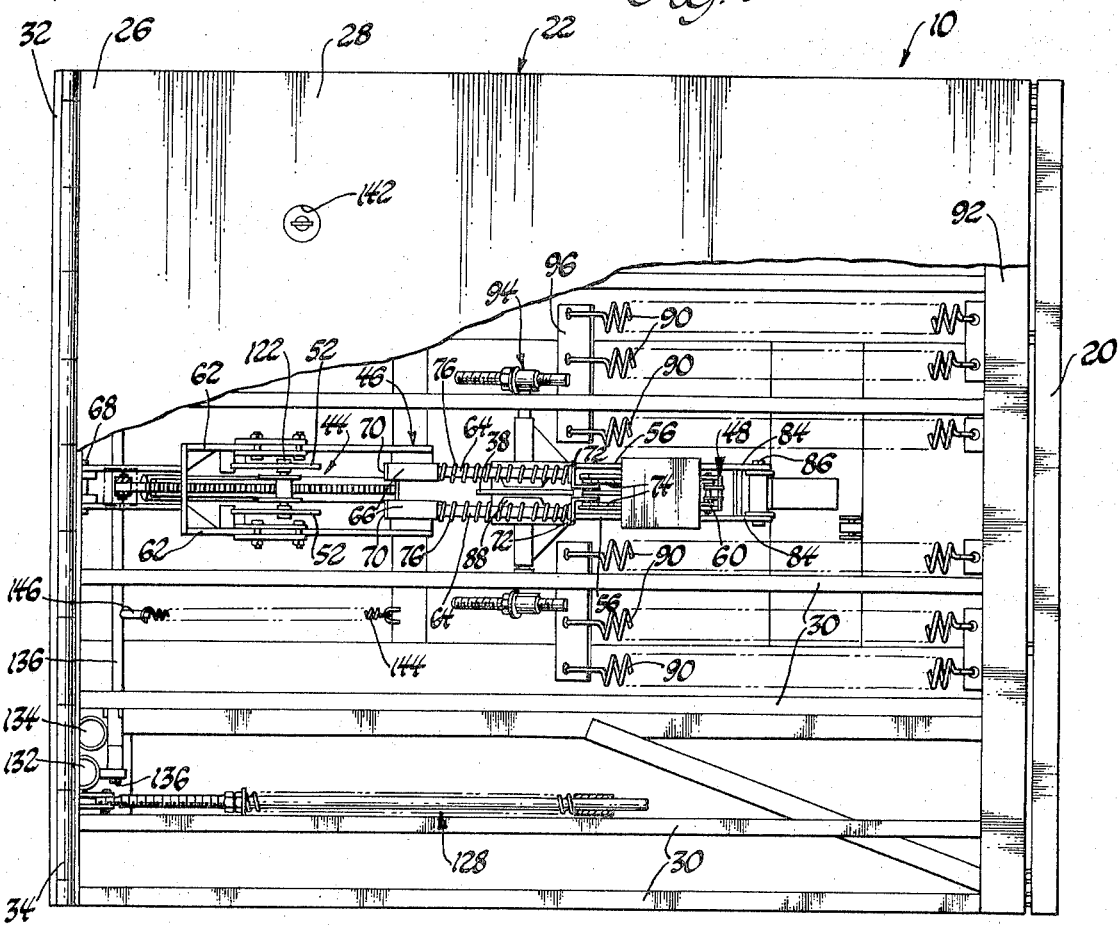
FIG. 5 is a plan view taken substantially along line 5—5 and showing the upper surface of the ramp broken away.
Figure 6:
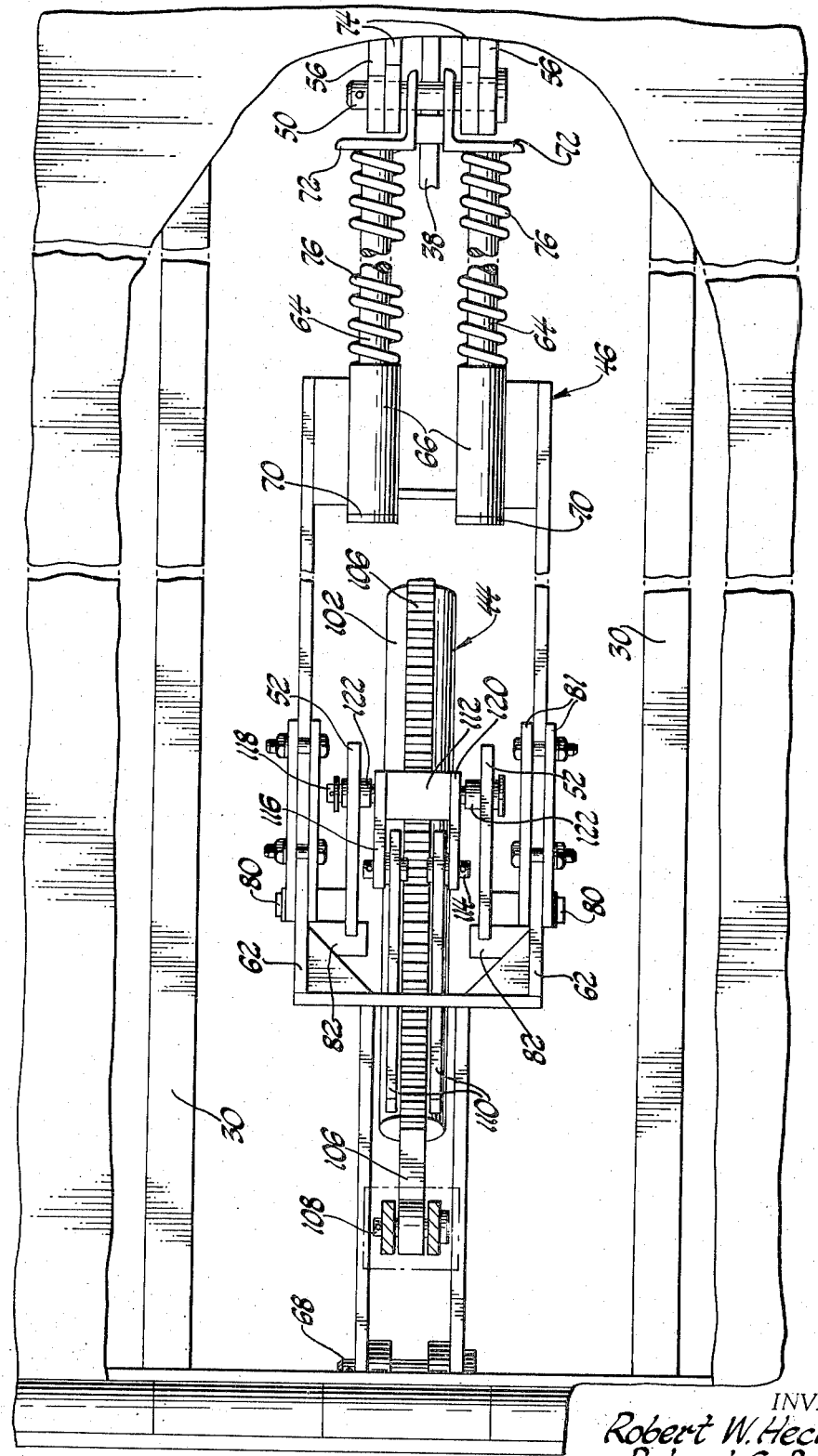
FIG. 6 is an enlarged fragmentary view showing the lip linkage means as shown in FIG. 5 but in larger scale.

The dockboard assembly 10 also includes a lip or lip means 32 pivotally connected to the second end 26 of the ramp 22 through a piano-type hinge 34 for pivotal movement between an extended cantilevered position, as illustrated in FIGS. 2 and 4, and a pendent position, as illustrated in FIGS. 1 and 5.

A mount comprising a pair of spaced parallel plates 36 depends downwardly from the underside of the ramp plate 28. A cam 38 is rotatably connected to the ramp 22 by being rotatably supported between the plates 36 by a pin 40.

As indicated in FIG. 2, the dockboard assembly 10 also includes lift means, generally indicated at 42, reacting between the structural members 16 of the support means and the cam 38 for pivoting the ramp 22 upwardly from any position in which the ramp is disposed.

The dockboard assembly 10 also includes releasable hold-down means generally indicated at 44 for normally preventing the ramp 22 from being pivoted upwardly by the lift means 42 and operable or actuatable to allow the ramp 22 to be pivoted upwardly by the lift means 42. The hold-down means 44 also automatically allows the ramp 22 to pivot downwardly.

Lip linkage means generally indicated at 46 is also included for pivoting the lip 32 toward the extended position in response to rotational movement of the cam 38.

Latching means generally indicated at 48 is movable to a latched position illustrated in FIG. 2 for supporting the lip 32 in an extended latched position. The latching means 48 is operatively connected to the lip linkage means by the pin 50 and is engageable by the cam 38 at a position spaced from the connection 50 thereof to the lip linkage means 46 for movement by the cam 38 to the latched position.

As will become more clear hereinafter, the latching means 48 automatically moves or free falls by gravity from the latched position illustrated in FIG. 2 to an unlatched position illustrated in FIG. 4 when the lip 32 is pivoted upwardly from the extended latched position illustrated in FIG. 2 which is after the cam 38 is rotated out of engagement with the latching means 48.

The dockboard assembly 10 also includes control means defined by a pair of control pawls 52 for automatically releasing the hold-down means 44 in response to pivotal movement of the lip 32 toward the pendent position from the extended position illustrated in FIG. 4 thereby to allow the ramp 22 to pivot upwardly. The control pawls 52 are pivotally attached to the lip linkage means 46 and are engageable with the hold-down means 44 for releasing the latter.

An abutment pin 54 extends laterally from each of the plates 36 of the mount. The latching means 48 includes a latch link 56 pivotally connected at a first end by the pin 50 to the lip linkage means 46 and having an upwardly opening recess 58 therein adjacent the second end for engaging the abutment pin 54. The latch link 56 is generally U-shaped having a pair of parallel legs disposed on opposite sides of the plates 36 with each leg having a recess 58 therein. The latching means 48 also includes a resilient member comprising the spring 60 attached to the latch link 56 at the base thereof which extends between the legs. The spring is disposed between the cam 38 and the latch link 56 for allowing continued rotation of the cam 38 in the counterclockwise direction as viewed in FIGS. 1, 2 and 4 after the cam 38 has moved the latch link 56 to the latched position where the recess 58 engages the abutment pin 54.

The lip linkage means 46 includes first and second telescoping links 62 and 64. The first link 62 comprises a pair of spaced legs supporting tubular members 66 at one end and connected through two more closely spaced legs to the lip 32 by a pivot pin 68. The second link 64 includes a pair of parallel rods which extend through the tubular members 66 and include enlarged ends 70 which may not be pulled through the tubular member 66. The second link 64 includes the angled members 72 which are pivotally connected to a guide leg 74 by the pin 50. The guide leg 74 is pivotally connected at the other end to the plates 36 of the mount by the pin 40. Springs 76 urge the first and second telescoping links 62 and 64 apart. In other words, the rods defining the second link 64 are urged out of the tubular members 66. The springs 76 are strong enough to normally support the weight of the lip 32, however, should the lip 32 be in the extended position and a vehicle backs into the lip to force the lip downwardly when the latch link 56 is in the latched position illustrated in FIG. 2, the links 62 and 64 will telescope together allowing the lip to pivot downwardly without damaging the latching mechanism.

The cam 38 has a notch 78 therein for engaging the pin 50 which defines the pivotal connection between the guide link 74 and the second link 64 for raising the lip 32 toward an extended position as the ramp is moved upwardly by the lift means 42 and the cam rotates in a counterclockwise direction as illustrated in FIGS. 1, 2 and 4, i.e., the cam is rotated by reaction between the ramp and the lift means as the ramp pivots.

The control pawls 52 are pivotally connected by pins 80 to the first link 62 through the clamping brackets 81 which are bolted onto the legs of the first link 62. The pins 80 extend through tubular sleeves which are welded or otherwise secured to the pawls 52 and then through the brackets 81. A stop plate 82 extends from each of the legs of the first link 62 for limiting pivotal movement of the control pawls 52 in the clockwise direction as illustrated in FIGS. 1, 2 and 4.

The lift means 42 includes a lift arm 84 which is pivotally connected by pin 86 to the support means at a first end thereof. A rotatable cam follower 88 is rotatably supported at the second end of the lift arm 84 for rotatably engaging the cam 38. The lift means also includes biasing means comprising the springs 90 which are attached at one end to a channel member 92 of the ramp 22. Attachment means 94 including the elongated plate 96 attaches the other end of the springs 90 to the upper end of the lift arm 84. It should be appreciated that the springs 90 may be attached to the ramp 22 as illustrated adjacent the pivotal connection 24 of the ramp to the support means or may be attached directly to the support means adjacent the pivotal connection 24 of the ramp and support means. The springs 90 are strong enough to pivot the ramp 22 upwardly from any position in which the ramp is disposed when the hold-down means 44 is released.

The hold-down means 44 includes a rod 98, as illustrated in FIG. 2, which is pivotally connected at 100 to the support means. A cylinder 102 is disposed about the rod 98. A spring 104 is disposed within the cylinder 102 and reacts between the upper end of the rod 98 and the lower or bottom of the cylinder 102 for urging the rod 98 into the cylinder 102. As will become more clear hereinafter, the spring 104 and its coaction between the rod 98 and the cylinder 102 provides a yieldable connection between the hold-down means 44 and the support means to allow the ramp 22 to pivot upwardly when the hold-down means has not been released. Such a circumstance can result when the lip 32 is disposed on the bed of an adjacent truck and the hold-down means is locked and the bed of the truck moves upwardly as it is unloaded.

The hold-down means 44 further includes an elongated ratchet bar 106 which is pivotally connected at 108 to the ramp 22. A pair of parallel guide plates 110 extend upwardly from the cylinder 102 and the ratchet bar 106 is slidably retained between the guide plates 110. A ratchet pawl 112 is rotatably connected by a pin 114 to the guide plates 110 and normally engages the ratchet bar 106 to prevent upward pivotal movement of the ramp 22. The ratchet bar 106 and the ratchet pawl 112 have coacting ratchet teeth for preventing upward pivotal movement of the ramp 22 while allowing downward pivotal movement of the ramp 22 when the hold-down means is engaged. In other words, the ratchet teeth coacting between the ratchet pawl 112 and the ratchet bar 106 allow the ratchet bar 106 to be moved upwardly only when the hold-down means is released but allows free movement of the ratchet bar 106 downwardly past the ratchet pawl 112 in response to a weight on the ramp 22 without releasing the hold-down means 24.

A lever 116 is connected to the ratchet pawl 112 by a shaft 118 and is pivotally connected to the plates 110 by the pin 114 for moving the ratchet pawl 112 out of engagement with the ratchet bar 106 for releasing the hold-down means 44. The lever 116 is disposed on one side of the cylinder 102 and is rigidly secured to the shaft 114. A short link 120 is rigidly secured to the pin 114 on the other side of the cylinder 102. Rollers 122 are disposed on the ends of the shaft 118 outwardly of the lever 116 and outwardly of the link 120. As illustrated in FIG. 4, the control pawls 52 engage the rollers 122 for pivoting the lever 116 counterclockwise about the axis of pin 114 to disengage the ratchet pawl 112 from the ratchet bar 106.

In addition, the chain 124 is connected to the lever 116 and extends about a roller supported by the bracket 125 to a pocket 126 where it is manually accessible from above the ramp 122 for manually releasing the hold-down means 44.

The dockboard assembly 10 also includes a lip assist means, generally indicated at 128 in FIG. 5, to provide a biasing action urging the lip 32 to pivot upwardly so as to assist the upward pivotal movement of the lip 32 to the latched position. The lip assist means 128 is not, however, alone sufficiently strong to pivot the lip 32 upwardly from the pendent position.

The dockboard assembly 10 also includes a safety leg assembly generally indicated at 130. The safety leg assembly 130 includes a pair of legs adjacent each side of the assembly with one leg 132 being longer than the other leg 134. Both legs 132 and 134 are pivotally connected to the support structure by a shaft 136 whereby the legs 132 and 134 may be rotated rearwardly about the axis of the shaft 136 to be moved out of the way to allow the ramp 22 to be pivoted downwardly to a below dock level position. The longer legs 132 are of a height so as to engage the ramp 22 to support the ramp in the dock level position as illustrated in FIG. 1. A chain 138 is attached to the assembly 130 and extends about a roller supported by a bracket 140 to a pocket 142 where the chain is accessible from above the ramp 22 so that the support legs 132 and 134 may be pivoted about the axis of the shaft 136 to allow the ramp 22 to move to below the dock level position.

As illustrated in FIG. 5, a spring 144 is connected at one end to the support means and is connected to a downwardly extending arm 146 at the other end to bias the support legs 132 and 134 to the upright or vertical position. When the chain 138 is placed in tension, the longer legs 132 are first moved rearwardly to allow the ramp 22 to move downwardly where it would engage the shorter legs 134. Rollers 122 engage arms 52 and cause arms 52 to pivot upwardly around pin 80 to allow the platform to be lowered below dock level with the lip 32 in the pendent position. There is an interlock between the legs 132 and the legs 134 so that after the legs 132 have been pivoted a given amount, the legs 134 will be pivoted out of the way of the ramp 22 so that the ramp 22 may be pivoted even farther downwardly below the dock level position.

OPERATION

Normally, the dockboard assembly 10 is stored in the dock level position illustrated in FIG. 1 where it is prevented from moving below dock level by the long safety legs 132. To use the dockboard assembly 10 to load or unload a vehicle adjacent the dock, the chain 124 is grasped in the pocket 126 to rotate the lever 116 to disengage the ratchet pawl 112 from the ratchet bar 106 thereby releasing the hold-down means 44 and allowing the ramp to pivot upwardly under the upward biasing action of the springs 90 of the lift means 42. As the ramp 22 pivots upwardly, the cam follower 88 moves rearwardly along the periphery of the cam 38 to rotate the cam 38 in a counterclockwise direction as viewed in FIGS. 1, 2 and 4. As the cam 38 thusly rotates, the notch 78 engages the pin 50 to move the lip linkage means 46 forwardly to pivot the lip 32 upwardly from the pendent position toward the extended cantilevered position illustrated in FIG. 2. As the cam 38 is thusly rotating, it engages the spring 60 of the latching means 48 to move the latch link 56 upwardly until the recess 58 engages the abutment pin 54. Once the recess 58 engages the abutment pin 54 and the cam 38 continues to rotate in the counterclockwise direction, the spring 60 compresses to retain the latch link 56 in the latched position. The spring 60 thus retains the latch link 56 in the latched position over a predetermined amount of rotational movement of the cam 38.

The operator maintains a tension on the chain 124 to maintain the hold-down means 44 in the released position until the lip 32 reaches the extended latched position illustrated in FIG. 2 whereupon the operator releases the chain 124 to re-engage the hold-down means 44 to prevent further upward movement of the ramp 22. In this position, the operator walks out on the ramp 22 and the ramp 22 pivots downwardly. As the ramp 22 pivots downwardly, the cam 38 rotates in the clockwise direction and the notch 78 moves away from the pin 50 and the weight of the lip 32 maintains the latch link 56 in engagement with the abutment pin 54, thus retaining the lip 32 in the latched position. The lip 32 will remain in the latched position until the lip 32 engages an adjacent vehicle such as the bed of an adjacent truck. When the lip 32 engages the bed of an adjacent truck, the lip 32 pivots upwardly from the extended latched position illustrated in FIG. 2 and the latch link 56 falls under the force of gravity from the latched position to the position illustrated in FIG. 4.

The dockboard assembly 10 as illustrated in FIG. 4 is in position for facilitating the movement of traffic between the dock and an adjacent vehicle. In this position, the lip 32 abuts at its rear edge the front end 26 of the ramp 22. The ramp is prevented from moving upwardly by the hold-down means 44. In the event a truck is being unloaded so that the bed of the truck moves upwardly, damage to the hold-down mechanism is prevented by the yieldable connection between the hold-down means 44 and the support means, i.e., through compression of the spring 104. In other words, the spring 104 will compress as the bed of the truck moves upwardly as weight is removed therefrom by unloading. In the event that the bed of the truck moves downwardly as by being loaded, the ramp 22 may freely move downwardly in that the hold-down means 44 freely allows the ramp 22 to move downwardly.

When the truck or adjacent vehicle moves away from the dock, the lip 32 rotates downwardly. The control pawls 52 are disposed beneath the rollers 122 and are prevented from pivoting or rotating further in a clockwise direction by the stops 82. Thus, as the lip linkage 46 moves rearwardly as the lip 32 pivots toward the pendent position, the control pawls 52 move the rollers 122 upwardly to pivot or rotate the lever 116 and the link 120 to disengage the ratchet pawl 112 from the ratchet bar 106. This in turn automatically allows the ramp 22 to pivot upwardly under the influence of the lift means 42 to a predetermined position above dock level. When the ramp reaches this predetermined position above dock level, the control pawls 52 disengage the rollers 122 and the rollers 122 fall under the force of gravity to re-engage the ratchet pawl 112 with the ratchet bar 106. When the control pawls 52 disengage the rollers 122 and the rollers 122 move downwardly, the lip 32 continues to move toward the pendent position and the control pawls 52 ride over or atop of the rollers 122. The ramp 22 is then pivoted downwardly by the operator by walking out onto the ramp 22 whereby the ramp is returned to the storage position illustrated in FIG. 1.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A dockboard assembly comprising: support means, ramp means pivotally connected at a first end thereof to said support means for movement between raised and lowered positions and extending to a second end, lip means pivotally connected to said second end of said ramp means for pivotal movement between an extended cantilevered position and a pendent position, a cam rotatably connected to said ramp means, lift means reacting between said support means and said cam for pivoting said ramp means upwardly from any position in which said ramp means is disposed, said cam being rotated by reaction between said ramp and said lift means as said ramp pivots, releasable hold-down means for normally preventing said ramp means from being pivoted upwardly by said lift means and operable to allow said ramp means to be pivoted upwardly by said lift means, lip linkage means for pivoting said lip means toward said extended position in response to rotational movement of said cam, latching means movable to a latched position for supporting said lip means in an extended latched position and operably connected to said lip linkage means and engageable by said cam at a position spaced from the connection thereof to said lip linkage means for movement by said cam to said latched position, said latching means free falls by gravity from said latched position when said lip means is pivoted upwardly from said extended latched position after said cam is rotated out of engagement with said latching means.

2. An assembly as set forth in claim 1 including control means operatively connected to said lip means for releasing said hold-down means in response to pivotal movement of said lip means toward said pendent position to allow said ramp means to pivot upwardly.

3. An assembly as set forth in claim 2 wherein said control means is attached to said lip linkage means and is engageable with said hold-down means for releasing the latter.

4. An assembly as set forth in claim 3 wherein said control means includes at least one control pawl pivotally connected to said lip linkage and depending therefrom.

5. An assembly as set forth in claim 4 wherein said latching means includes a latch link pivotally connected at a first end to said lip linkage means and having an upwardly opening recess therein, an abutment disposed on said ramp means for engaging said recess, said latch link engageable by said cam for upward movement thereby to said latched position where said abutment is disposed in said recess.

6. An assembly as set forth in claim 5 wherein said latching means further includes a resilient member disposed between said cam and said latch link for allowing continued rotation of said cam after said cam has moved said latch link to said latched position.

7. An assembly as set forth in claim 6 wherein said lift means includes a lift arm pivotally connected to said support means at a first end thereof, a rotatable cam follower disposed on the second end of said lift arm for engaging said cam, and biasing means attached at one end thereof to said lift arm and attached at the other end thereof to one of said support means and said ramp means at a position adjacent the pivotal connection between said ramp means and said support means for urging said lift arm to pivot upwardly, said biasing means being sufficient to pivot said ramp means upwardly from any position upon release of said hold-down means; a mount suspended from said ramp means and rotatably supporting said cam, said abutment comprising a pin extending laterally from said mount; said lip linkage means including first and second telescoping links urged apart by at least one spring, said first link being pivotally connected to said lip means, a guide link pivotally connected to said mount at one end and pivotally connected to said second link at the other end, said cam having a notch for engaging the pivotal connection between said guide link and said second link for raising said lip means toward said extended position, said latch link being pivotally connected to said second link at the pivotal connection between said guide link and said second link, said control pawl being pivotally connected to said first link, stop means extending from said first link for limiting pivotal movement of said control pawl; said hold-down means includes a rod pivotally connected to said support means, a cylinder disposed about said rod, a spring disposed within said cylinder and reacting between said cylinder and said rod for urging said rod into said cylinder, an elongated ratchet bar pivotally connected to said ramp means, guide plates extending from said cylinder, said ratchet bar being slidably retained between said guide plates, a ratchet pawl rotatably connected to said guide plates and normally engaging said ratchet bar to prevent upward pivotal movement of said ramp means, said ratchet bar and said ratchet pawl having coacting ratchet teeth for preventing upward pivotal movement of said ramp means and allowing downward pivotal movement of said ramp means while engaged, a lever connected to said ratchet pawl for moving said ratchet pawl out of engagement with said ratchet bar for releasing said hold-down means, said control pawl being engageable with said lever for disengaging said ratchet pawl from said ratchet bar, manually actuatable means connected to said lever for manually releasing said hold-down means.

8. A dockboard assembly comprising: support means, ramp means pivotally connected at a first end thereof to said support means and extending to a second end, lip means pivotally connected to said second end of said ramp means for movement between a pendent position and an extended cantilevered position, a cam rotatably connected to said ramp means, lift means reacting between said support means and said cam for urging said ramp means to pivot upwardly, lip linkage means for pivoting said lip means toward said extended position, latching means movable to a latched position for supporting said lip means in an extended latched position and operably connected to said lip linkage means and engageable by said cam at a position spaced from the connection thereof to said lip linkage means for movement by said cam to said latched position, said latching means including a latch link pivotally connected at a first end to said lip linkage means and having an upwardly opening recess therein, an abutment disposed on said ramp means for engaging said recess, said latch link engageable by said cam for upward movement thereby to said latched position where said abutment is disposed in said recess.

9. An assembly as set forth in claim 8 wherein said latching means further includes a resilient member disposed between said cam and said latch link for allowing continued rotation of said cam after said cam has moved said latch link to said latched position.

10. A dockboard assembly comprising: support means, ramp means pivotally connected at a first end thereof to said support means and extending to a second end, lift means for pivoting said ramp upwardly, releasable holding means for allowing and preventing said ramp from being pivoted upwardly by said lift means, a lip pivotally connected to said second end of said ramp for pivotal movement between an extended cantilevered position and a pendent position, lip linkage means for pivoting said lip means toward said extended position, and control means supported by said lip linkage means for automatically releasing said hold-down means in response to pivotal movement of said lip means toward said pendent position to allow said ramp means to pivot upwardly.

11. An assembly as set forth in claim 10 including latching means movable to a latched position for supporting said lip means in an extended latched position and operably connected to said lip linkage means and automatically movable from said latched position when said lip means is pivoted upwardly from said extended latched position.

12. An assembly as set forth in claim 11 wherein said control means includes at least one control pawl pivotally connected to said lip linkage and depending therefrom for engaging said hold-down means as said lip means pivots toward said pendent position after said latching means automatically moves from said latched position.

13. An assembly as set forth in claim 10 wherein said lip linkage means is pivotally connected to said lip means at a first end and extends rearwardly to a second end which is moved forwardly to raise said lip means in response to upward pivotal movement of said ramp means by said lift means.

* * * * *